United States Patent
Williams et al.

(10) Patent No.: US 6,389,960 B1
(45) Date of Patent: May 21, 2002

(54) GAS-FIRED COOKING DEVICE WITH GRIDDLE SURFACE HEATED BY HEAT BANK

(75) Inventors: Rafé T. Williams, Raleigh; Robert Van Murray; Robert C. Vroom, both of Fuquay-Varina, all of NC (US)

(73) Assignee: Middleby-Marshall, Inc., Elgin, IL (US)

( * ) Notice: Subject to any disclaimer, the term of this patent is extended or adjusted under 35 U.S.C. 154(b) by 0 days.

(21) Appl. No.: 09/904,391

(22) Filed: Jul. 12, 2001

(51) Int. Cl.[7] .......................... A47J 37/00; A47J 37/07; F24C 3/00; F24C 3/14; A23L 1/00
(52) U.S. Cl. .......................... 99/339; 99/340; 99/401; 99/422; 99/447; 99/448; 126/39 J; 126/41 R
(58) Field of Search .......................... 99/331, 339, 340, 99/337, 400, 401, 419–421 V, 444–450, 482; 126/41 R, 39 J, 39 R, 39 N, 390, 394; 219/459, 462, 530, 445

(56) References Cited

U.S. PATENT DOCUMENTS

| | | | |
|---|---|---|---|
| 2,597,127 A | * 5/1952 | Rahr | 99/447 |
| 3,019,720 A | * 2/1962 | Topper | 99/339 |
| 3,444,805 A | * 5/1969 | Happel et al. | 99/447 |
| 3,742,838 A | * 7/1973 | Luschen et al. | 126/25 R |
| 4,094,295 A | * 6/1978 | Boswell et al. | 99/446 |
| 4,430,559 A | * 2/1984 | Rabay | 99/419 X |
| 4,446,846 A | * 5/1984 | Hahn | 126/41 R |
| 4,454,805 A | * 6/1984 | Matthews | 99/401 X |
| 4,539,973 A | * 9/1985 | Hait | 126/41 R |
| 4,727,853 A | * 3/1988 | Stephen et al. | 99/444 |
| 4,773,319 A | * 9/1988 | Holland | 99/450 X |
| 4,800,865 A | * 1/1989 | Setzer | 99/401 X |
| 4,823,684 A | * 4/1989 | Traeger et al. | 99/447 |
| 5,163,358 A | 11/1992 | Hanagan et al. | |
| 5,355,868 A | 10/1994 | Haen | |
| 5,413,032 A | 5/1995 | Bruno et al. | |
| 5,676,043 A | 10/1997 | Best | |
| 5,765,469 A | 6/1998 | Schlosser et al. | |
| 5,806,412 A | 9/1998 | Bedford et al. | |
| 5,890,482 A | 4/1999 | Farnsworth et al. | |
| 5,964,145 A | 10/1999 | Brown | |
| 6,035,766 A | 3/2000 | Schirmer | |
| 6,176,173 B1 | 1/2001 | Holbrook et al. | |

* cited by examiner

Primary Examiner—Timothy F. Simone
(74) Attorney, Agent, or Firm—Coats & Bennett, P.L.L.C.

(57) ABSTRACT

A more uniform heating of a griddle surface of a gas-fired cooking device is provided by a plurality of heating chambers disposed below the griddle surface, with each of the heating chambers heated by at least one naturally fed gas burner. A portion of the hot combustion gases rise into upper zones associated with each heating chamber that have relatively low average front-to-back air flow therein. The upper zones have sidewalls and downwardly extending dam walls that cooperate to create the low flow zones beneath the griddle surface. The relatively low flow rates within the low flow zones allow a more uniform layer of hot combustion gases to be formed along the underside of the griddle surface, thereby more evenly delivering heat to the griddle surface. There may be two or more such heating chambers.

25 Claims, 4 Drawing Sheets

GAS-FIRED COOKING DEVICE WITH GRIDDLE SURFACE HEATED BY HEAT BANK

BACKGROUND OF THE INVENTION

The present invention relates generally to the field of gas-fired cooking devices, and specifically to a gas-fired cooking device that includes a heat bank to provide a more uniformly heated cooking surface.

Gas cooking devices, such as gas-fired griddles, commonly utilize multiple burners located in various locations beneath the heated surface. Air and fuel, such as natural gas, propane, or the like, are provided to the burners, which burn the fuel to create hot combustion gases. Because each individual burner provides hot combustion gases to a limited area, the heated surface may develop hot and cold zones. For instance, hot zones typically develop directly over each burner and cool zones develop between the burners. Such uneven heating may lead to undesirable cooking results. As such, there is a need for an apparatus that combusts gas in such a way as to provide a more uniformly heated surface, resulting in improved cooking performance.

SUMMARY OF THE INVENTION

The present invention provides a more uniform heating of a griddle surface of a gas-fired cooking device. A plurality of heating chambers are disposed below the griddle surface and include a lower zone and an upper zone. Each of the heating chambers is heated by at least one naturally fed gas burner generally disposed in the corresponding lower zone. The gas burners generate hot combustion gases, a portion of which rise into the corresponding upper zone disposed between the lower zone and griddle surface associated with each heating chamber. The upper zones have sidewalls and downwardly extending rear flow-restricting walls, or dams, that cooperate to create a zone of relatively stagnant flow beneath the griddle surface. The relatively low average front-to-back flow rates within the upper zones allow a more uniform layer of hot combustion gases to be formed along the underside of the griddle surface, thereby more evenly delivering heat to the griddle surface. In some embodiments, the vertical depth of the upper zones is deliberately varied, from deeper to thinner moving laterally in toward the center of the griddle surface. There may be two or more heating chambers.

DETAILED DESCRIPTION OF THE INVENTION

Figure 1:
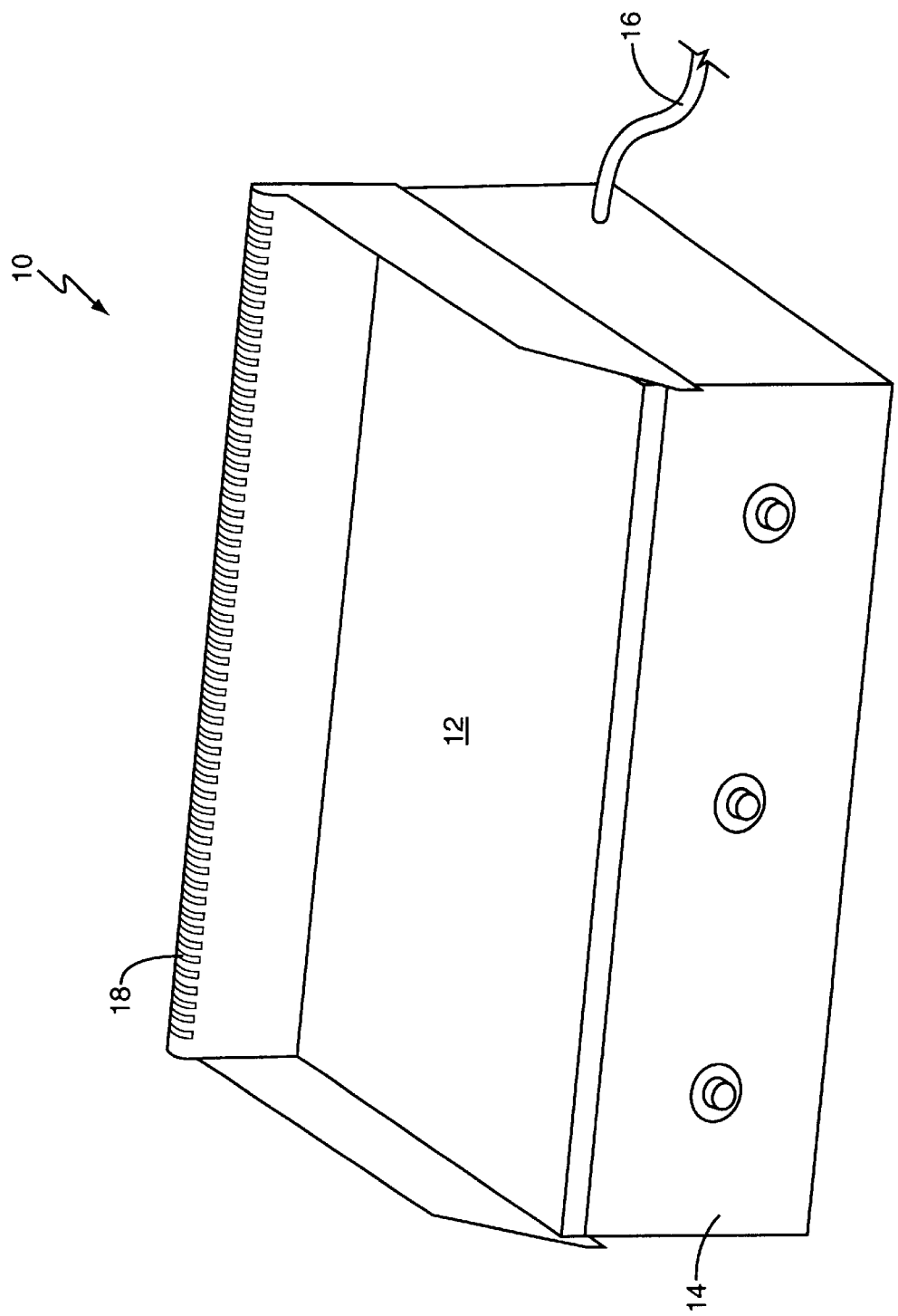
FIG. 1 is a perspective view of one embodiment of a gas-fired cooking device according to the present invention.

While the cooking devices 10 according to the present invention may be gas-fired griddles, braising pans, or what are sometimes referred in the field as "skillets," a griddle will be used as an exemplary cooking device 10 for simplicity of illustration, without limiting the invention thereto. As shown in the Figures and described more fully below, the griddle 10 utilizes a plurality of upper zones 40 having relatively slow moving hot combustion gases therein and located below the generally planar surface to be heated 12 to help provide uniform heating to the surface 12. The upper zones 40 are created by flow-restricting walls 42,46 that act to create a hot air pocket in the upper zone 40, as described more fully below.

The griddle 10 generally includes an outer housing 14 with a generally planar surface to be heated 12. Because it is common, but not necessary, for food to be placed directly on the surface 12 for cooking, this surface 12 is sometimes referred to as the "cooking surface" or the "griddle surface." The cooking surface 12 is shown as being smooth, but the cooking surface 12 may optionally include one or more grooves as is known in the art.

A plurality of generally front-to-back heating chambers 20 are disposed within the outer housing 14. The heating chambers 20 shown are disposed in a laterally adjacent configuration, meaning that they generally run front-to-back and are disposed in a left-to-right series. Laterally adjacent heating chambers 20 are not required to "touch" each other (e.g., share a common intervening wall 44), although such an arrangement may be advantageous.

Disposed generally within the heating chambers 20 are respective gas burners 22. These burners 22 use a natural, unforced, draft for supply air; as such, they are of the type generally referred to as "naturally fed gas burners." Such burners 22 are to be contrasted with forced air burners that utilize a forced air stream (or air/fuel stream), such as one generated by a fan.

The outer housing 14, burners 22, cooking surface 12, and controls (not shown) may be generally similar to those of the model SGS-36, sold by Southbend of FuquayVarina, N.C., a division of Middleby-Marshall, Inc. of Chicago.

Each heating chamber 20 includes a lower or burner zone 30, where the hot combustion gases are generated, and an upper or low-flow zone 40 disposed above the lower zone 30 and below the underside of the cooking surface 12.

The burner zone 30 is generally bounded by the floor plate 24 on its lower side, the corresponding sidewalls 44, and the underside of the upper zone 40. The upper zone 40 is generally defined by the underside of the cooking surface 12 and flow-restricting walls, specifically a front dam wall 42, a rear dam wall 46, and sidewalls 44 associated therewith. At least the front dam 42 and the rear dam 46 are downwardly extending, thereby extending generally away from the underside of the cooking surface 12. While the front dam 42 and the rear dam 46 may be perpendicular to the underside of the cooking surface 12, they are not required to be; for instance, the rear dam 46 may advantageously be angled towards the front of the cooking device 10 by 30°–45°. The rear dam 46 may have a stepped lower edge, with a higher section 46a and a lower section 46b. As shown in the Figures, the higher section 46a should be more centrally located with respect to the center of the cooking surface 12 than the lower section 46b.

Also, as shown in the FIGS., the upper zones 40 of adjacent heating chambers 20 may utilize opposite sides of an otherwise common sidewall 44. Further, the front dam 42 and the rear dam 46 of the various heating chambers 20 may simply be laterally different portions of respective continuous wall elements if desired.

It should be noted that the upper zone 40 and the burner zone 30 are advantageously generally of the same length and that there is advantageously no restriction disposed between the zones 30,40 so that "vertical" flow between the zones 30,40 may be in an unrestricted manner.

Each heating chamber 20 preferably includes a floor plate 24 disposed below the respective burner element 22. The floor plate 24 may advantageously include a plurality of secondary flow holes 26, discussed further below. The floor plate 24 should be spaced upwardly from the bottom of the outer housing 14, so as to help provide an inlet plenum 50 connecting an air inlet located at or near the rear of the griddle 10 (not shown) with the heating chambers 20.

One or more gas supply lines 16 connect the burners 22 in the griddle 10 to a supply of gas fuel, such as natural gas, propane, butane, and the like. The gas supply line(s) 16 may be regulated in any manner known in the art. In addition, while not shown, the griddle 10 should include the normal complement of controls and user interface (e.g., switches, knobs, warning lights, display, etc.), as is known in the art. These controls may include a suitable number of thermocouples disposed on the underside of the cooking surface, in corresponding protective grooves with thermoconductive paste if desired.

Figure 2:
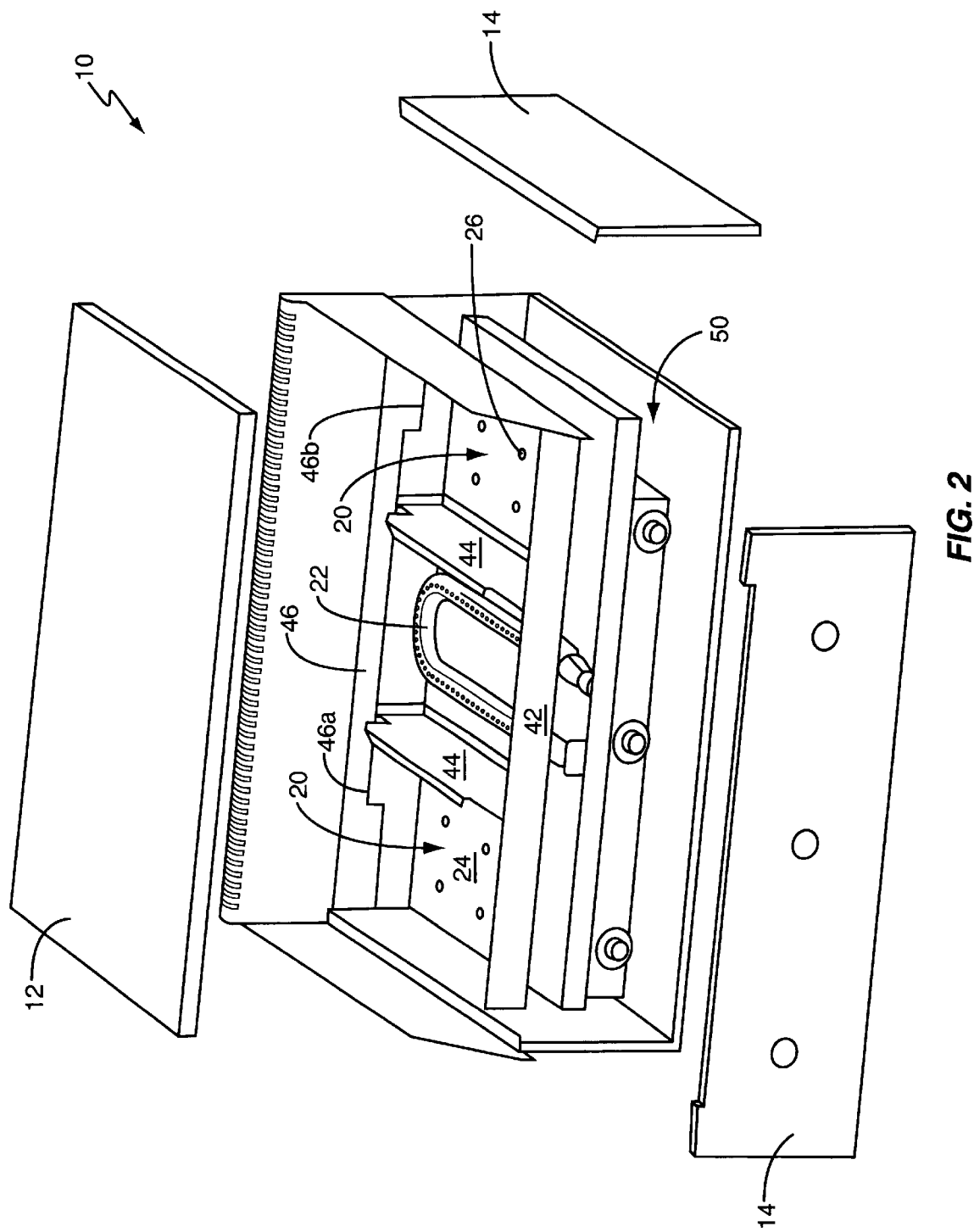
FIG. 2 is a partially exploded view of the gas-fired cooking device of FIG. 1.
Figure 3:
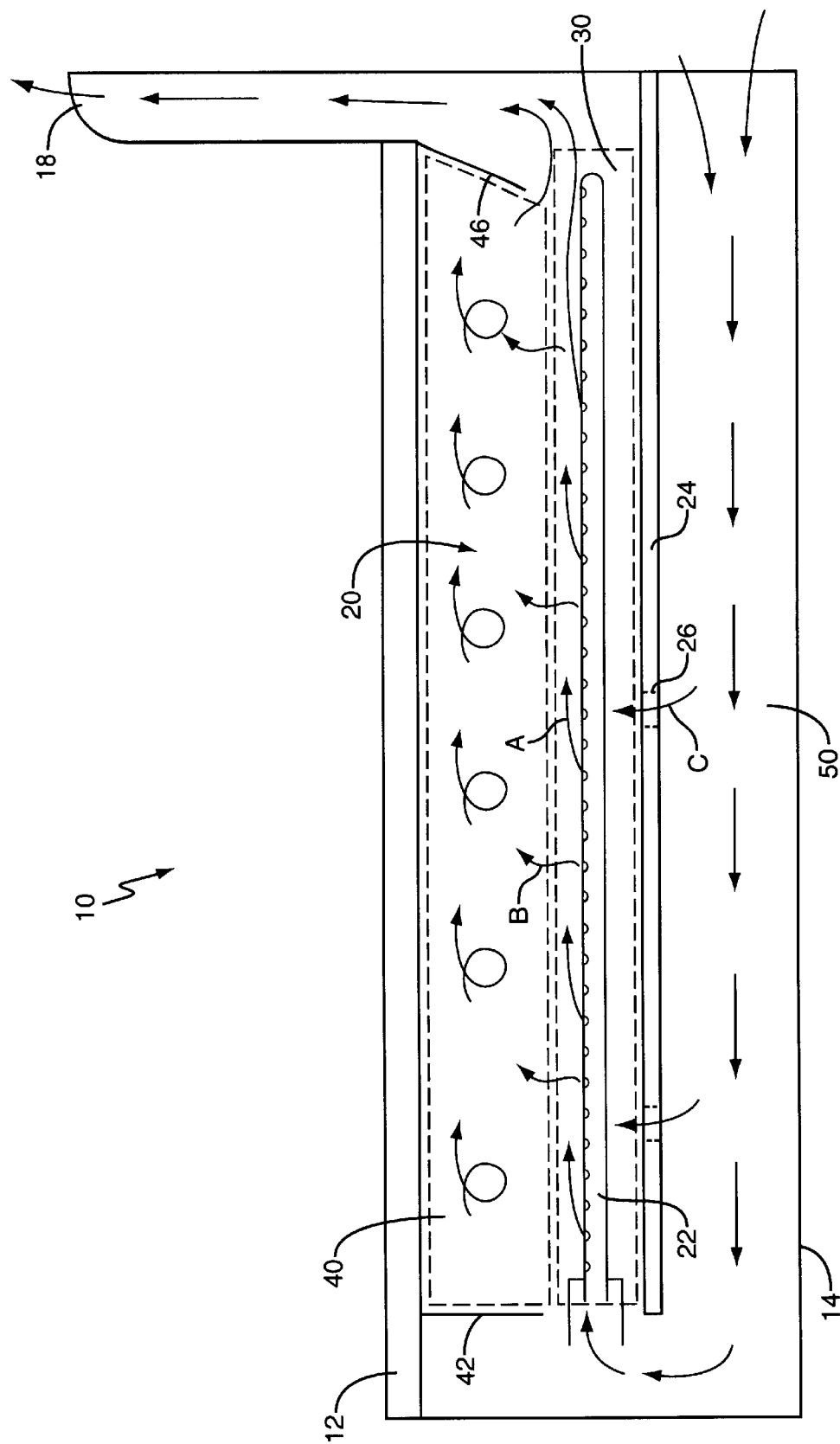
FIG. 3 is a sectional side view of the gas-fired cooking device of FIG. 1 showing illustrative air/combustion gas flows.

The flow through the griddle 10 may best understood with reference to FIG. 3. Fresh inlet air flows into the outer housing 14 at the rear portion thereof. The primary flow of the inlet air is forward through the inlet plenum 50, around the end of the floor plate 24, and to the burners 22. Note that the inlet plenum 50 may be a single plenum, with the flow therein divided downstream into the respective heating chambers 20, or may be a plurality of plenums 50, such as one for each heating chamber 20. Note also that the inlet plenum 50 is a natural flow plenum, not a forced flow. The burners 22 mix the inlet air with the fuel in any manner known in the art. This mixing may occur completely within the heating chamber 20, or may occur slightly upstream from the heating chambers 20. The air/fuel mixture is burned by the burners 22 to produce hot combustion gases. The hot combustion gases tend to rise within the heating chamber 20, but there is a significant front-to-back flow within the burner zone 30 caused by natural drafting. A portion of the hot combustion gases flow relatively directly out the exhaust located at the rear of each heating chamber 20. That is, a portion of the hot combustion gases exhaust relatively directly out of the heating chamber 20, through the opening between the bottom edge 46a,b of the rear wall 46 and the floor 24 and into an appropriate flue 18, as indicated by arrow A. Due to the natural drafting effect, this portion of the hot combustion gas tends to be somewhat focused along the burner 22. While a U-shaped (or J-shaped) burner configuration as shown in FIG. 2 helps supply heat to the cooking surface 12 with some degree of uniformity, a hot-fast flow through the burner zone 30 of the heating chamber 20 has a tendency to create hot and cold zones on the cooking surface 12 without the present invention.

In order to combat this, another portion of the hot combustion gases generated by the burner 22 is at least transiently dammed within the upper zones 40 beneath the cooking surface 12. This portion of the hot combustion gas follows the path indicated by arrow B.

This portion of the combustion gas flows up into the upper zone 40 and resides therein for an extended period of time. The extended stay in the upper zone 40 allows a more uniform layer of hot combustion gas to transfer its heat to the underside of the cooking surface 12, resulting in a more uniform heating thereof. When the "stagnant" combustion gas within the upper zone 40 has cooled, it descends below the lower edge 46a,b of the rear dam 46, joins the flow from the burner zone 30, and is carried out the flue 18. The presence of the perimeter wall (front dam 42, rear dam 46, and sidewalls 44) helps create the upper zone 40 where the portion of the hot combustion gases are at least temporarily trapped. It should be noted that the terms "dammed," "stagnant," "trapped," and the like are not intended to mean that the combustion gas enters the upper zone 40 and never exits, or even is necessarily held until the unit 10 is turned off. Instead, these terms are used to indicate that the average horizontal (front-to-back) flow rate through the lower zone 40 is relatively low, such as ten-fifteen percent or less of the relatively high flow rate through the burner zone 30 (which may, for example, have an average horizontal flow rate on the order of 85±10 ft/min). As such, the upper zone 40 may be thought of as a constantly recharging buffer zone that acts as a heat capacitor, or heat bank, that feeds heat to the cooking surface 12.

In order to more uniformly distribute the heat within the upper zone 40, it may be advantageous to have the upper zone 40 in a given heat chamber 20 vary in vertical thickness. One way of achieving this is to have the front wall 42 be a uniform large height, and have the rear flow-restricting wall 46 have a stepped vertical height with a shorter (shallower depth) section 46a, and a longer (deeper depth) section 46b, as described above. In this manner, sub-zones may be created in the upper zones 40, with a higher (but still low) flow rate in one sub-zone and a lower flow rate in another. Better results can be achieved if the "thicker" zones are located closer to the side extremes of the griddle cooking surface 12 and the "thinner" zones are located closer to the middle of the cooking surface 12. Alternatively, if three or more heating chambers are 20 used, the center-most heating chamber(s) 20 may have relatively shorter (shallower) rear flow-restricting wall 46, and therefore a "thinner" upper zone 40, while the outer-most heating chamber(s) 20 may have relatively longer (deeper) rear flow-restricting walls 46, resulting in "thicker" upper zones 40.

Figure 4:
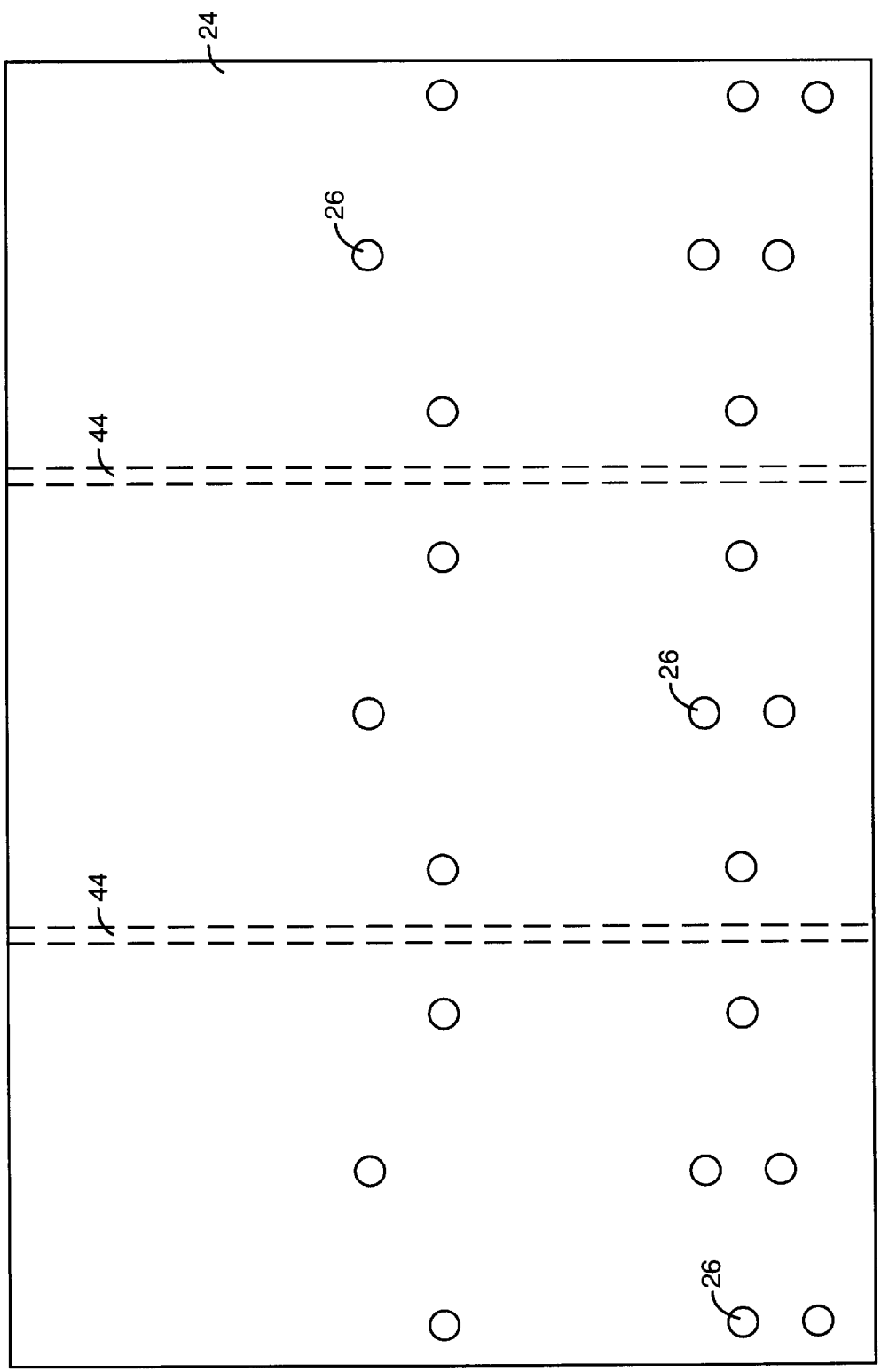
FIG. 4 is a top view of a floor plate showing possible locations of secondary flow holes therein.

The burner 22 may not perform properly if there is insufficient fresh air supply thereto along the length thereof due to the relatively low flow upper zones 40 being located somewhat close to the burners 22. This is particularly true of the rear-most portions of the burner 22. Better performance may be achieved if a portion of the inlet air in the inlet plenum 50 is allowed to enter the burner zone 30 via the secondary flow holes 26, as indicated by arrow C. The location and size of these secondary flow holes 26 is best determined by empirical testing. See FIG. 4 showing one suitable configuration for the location of the secondary flow holes 26 on the floor plate 24, with at least some of the secondary flow holes being located roughly in the front-to-back middle of the heating chamber 20. If secondary flow holes 26 are employed, it may also be advantageous to locate a deflector above the hole 26 so as to more evenly distribute the air provided thereby.

The embodiment shown in the FIGS. includes three heating chambers 20 disposed side by side. However, the present invention is not limited thereto and is intended to encompass gas-fired cooking devices 10 having two, three, four, or more heating chambers 20 with low flow upper zones 40. As such, the gas-fired cooking device 10 may be relatively narrow with only a few heating chambers 20 and corresponding burners 22, or may be relatively wide (e.g., ten or more feet), with more heating chambers 20 and corresponding burners 22. Also, configurations where a heating chamber 20 has one lower zone 30 feeding hot combustion gas to multiple upper zones 40 are within the scope of the present invention. Likewise, there may of course be more than one burner 22 in the burner zone 30 of each heating chamber 20 if desired.

Suitable results have been achieved with three heating chambers, arranged as shown in FIG. 2; upper zones 40 with depths on the order of one inch or more, formed by rear dams 46 of approximately 2⅜ length bent at approximately a 30° angle towards the front of the cooking device 10, and having an edge on the higher section 46a approximately ⅞ inch shorter than on the lower section 46b; front dams 42 of depth more than the rear dams 46; ⅝ inch diameter secondary flow holes 26 in the pattern shown in FIG. 4; propane fuel; and J-shaped burners 22 of 30,000 BTU size with a ported cross-over near the front.

Also, as pointed out above, the present invention may apply to a number of cooking devices 10, and is not limited to what is traditionally called a griddle. Thus, while the terms "griddle surface" and "cooking surface" have been used for surface 12, it is not required that the griddle surface 12 be a portion of what is traditionally called a griddle, or even that the surface 12 actually be used directly for cooking food. For instance, the cooking device 10 may be what is sometimes referred to as a braising pan, and the cooking surface may be used to boil water or to generate steam, which may in turn be used to cook food. All such arrangements are intended to be encompassed within the present invention.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A gas-fired cooking device, comprising:
   a generally planar griddle surface to be heated;
   a plurality of generally front-to-back heating chambers disposed below said griddle surface, each having a lower zone and an upper zone, said upper zone disposed below said griddle surface and above said lower zone;
   each of said heating chambers heated by at least one respective gas burner, fed by natural draft, generating hot combustion gases in said lower zone, at least a portion of said hot combustion gases flowing from said lower zone to said upper zone;
   each of said heating chambers having sidewalls and downwardly extending flow-restricting walls that cooperate with said sidewalls to create said upper zone for transiently retaining therein hot combustion gases from said lower zone;
   said upper zone having relatively slow average front-to-back flow rate therein and said lower zone having relatively faster average front-to-back flow rate therein.

2. The device of claim 1 wherein said flow-restricting walls include a front wall and a rear wall, said rear wall having a first lower edge portion spaced downwardly from said griddle surface a first distance and a second lower edge portion disposed farther from a center of said griddle surface than said first lower edge portion and spaced downwardly from said griddle surface a second distance, said second distance larger than said first distance.

3. The device of claim 2 wherein both said first lower edge portion and said second lower edge portion are associated with one of said heating chambers.

4. The device of claim 2 wherein said first lower edge portion is associated with a first of said heating chambers and said second lower edge portion is associated another of said heating chambers.

5. The device of claim 1 wherein each of said upper zones has a depth of not less than 1½ inches.

6. The device of claim 1 wherein the lower zone and the upper zone of at least one of said heating chambers have substantially the same length.

7. The device of claim 6 wherein combustion gases from the lower zone of said one of said heating chambers may freely flow into the corresponding upper zone of said one of said heating chambers in an unrestricted manner.

8. The device of claim 1 wherein said cooking device is selected from the group consisting of a griddle and a braising pan.

9. The device of claim 1 including a plate generally bounding at least one of said heating chambers on a lower side thereof, wherein said plate includes a plurality of flow holes therein for the inlet of secondary air into said at least one heating chamber.

10. The device of claim 9 wherein at least some of said flow holes have a diameter of approximately ⅝ inch and are disposed in a front-to-back direction generally towards the middle of said at least one heating chamber.

11. A gas-fired cooking device, comprising:
    a generally planar griddle surface to be heated;
    a plurality of generally front-to-back heating chambers disposed below said griddle surface and having a respective burner zone and a respective low flow zone disposed below said griddle surface and above said burner zone;
    each of said heating chambers heated by at least one respective gas burner, fed by natural draft, generating hot combustion gases in said burner zone, at least a portion of said hot combustion gases flowing from said burner zone to said low flow zone;
    each of said heating chambers having sidewalls and downwardly extending flow-restricting walls that cooperate with said sidewalls to create said low flow zone below said griddle surface and above said burner zone for transiently retaining therein said hot combustion gases from said burner zone.

12. The device of claim 11 wherein said flow-restricting walls include a front wall and a rear wall, said rear wall having a first lower edge portion spaced downwardly from said griddle surface a first distance and a second lower edge portion disposed farther from a center of said griddle surface than said first lower edge portion and spaced downwardly from said griddle surface a second distance, said second distance larger than said first distance.

13. The device of claim 12 wherein both said first lower edge portion and said second lower edge portion are associated with one of said heating chambers.

14. The device of claim 11 including a plate generally bounding at least one of said heating chambers on a lower side thereof, wherein said plate includes a plurality of flow holes therein for the inlet of air into said at least one heating chamber.

15. The device of claim 14 wherein at least some of said flow holes have a diameter of approximately ⅝ inch and are disposed in a front-to-back direction generally towards the middle of said at least one heating chamber.

16. A gas-fired cooking device, comprising:
    a housing having a griddle surface defining a generally planar surface to be heated;
    at least first and second heating chambers disposed below said griddle surface and internal to said housing;

a first gas burner disposed substantially within said first heating chamber and fed by natural draft;

a second gas burner disposed substantially within said second heating chamber and fed by natural draft;

said first heating chamber comprising:
- a first burner zone generally surrounding said first burner;
- a first buffer zone disposed between said first burner zone and said griddle surface and generally defined by said griddle surface and a downwardly extending perimeter wall comprising at least a first rear wall portion having a lower edge spaced downwardly from said griddle surface;
- wherein hot combustion gases from said first burner substantially fill an upper portion of said first buffer zone; and
- wherein cooling combustion gases from said first buffer zone exhaust under lower edge of said first rear wall;

said second heating chamber comprising:
- a second burner zone generally surrounding said second burner;
- a second buffer zone disposed between said second burner zone and said griddle surface and generally defined by said griddle surface and a downwardly extending perimeter wall comprising at least a second rear wall portion having a lower edge spaced downwardly from said griddle surface;
- wherein hot combustion gases from said second burner substantially fill said second buffer zone; and
- wherein cooling combustion gases from said second buffer zone exhaust under lower edge of said second rear wall.

17. The device of claim 16 wherein an average front-to-back flow rate through said first buffer zone is substantially less than an average front-to-back flow rate through said first burner zone.

18. The device of claim 16 wherein an average front-to-back flow rate through said first buffer zone is less than about 15% of an average front-to-back flow rate through said first burner zone.

19. The device of claim 16 wherein said lower edge of said first rear wall comprises at least a first section extending lower than a second section thereof, and wherein said second section is disposed closer to a center of said griddle surface than said first section.

20. The device of claim 16 wherein said first heating chamber and said second heating chamber share a common perimeter wall element.

21. The device of claim 16 wherein said first rear wall portion and said second rear wall portion comprise different sections of the same wall element.

22. The device of claim 16 wherein said cooking device is selected from the group consisting of a griddle and a braising pan.

23. The device of claim 16 including a plate generally bounding at least one of said heating chambers on a lower side thereof, wherein said plate includes a plurality of flow holes therein for the inlet of secondary air into said at least one heating chamber.

24. The device of claim 23 wherein at least some of said flow holes have a diameter of approximately $5/8$ inch and are disposed in a front-to-back direction generally towards the middle of said at least one heating chamber.

25. The device of claim 16 wherein said first heating chamber has one buffer zone.

* * * * *